United States Patent [19]

Ishihara

[11] 4,265,339

[45] May 5, 1981

[54] DISC BRAKE

[75] Inventor: Kanji Ishihara, Kawasaki, Japan

[73] Assignee: Tokico Ltd., Japan

[21] Appl. No.: 50,222

[22] Filed: Jun. 20, 1979

[30] Foreign Application Priority Data

Jun. 20, 1978 [JP] Japan .............................. 53-84195[U]

[51] Int. Cl.³ .......................................... F16D 55/228
[52] U.S. Cl. .................................. 188/72.5; 277/180; 285/379
[58] Field of Search ...................... 188/71.1, 72.5, 370; 285/DIG. 11, 379; 277/180

[56] References Cited

U.S. PATENT DOCUMENTS

| 3,055,456 | 9/1962 | Pfeiffer | 188/72.5 X |
| 3,195,906 | 2/1965 | Moyers | 277/180 |
| 3,280,933 | 10/1966 | Jones | 188/72.5 X |
| 3,424,275 | 1/1969 | Brueder | 188/72.5 X |
| 3,675,743 | 7/1972 | Thompson | 188/72.5 |
| 3,840,257 | 10/1974 | Moore | 285/DIG. 11 X |

FOREIGN PATENT DOCUMENTS

| 227118 | 2/1960 | Australia | 188/72.5 |
| 1126261 | 3/1962 | Fed. Rep. of Germany | 188/72.5 |
| 1130310 | 5/1962 | Fed. Rep. of Germany | 188/72.5 |
| 783397 | 9/1957 | United Kingdom | 285/379 |
| 1072903 | 6/1967 | United Kingdom | 188/71.1 |

*Primary Examiner*—George E. A. Halvosa
*Attorney, Agent, or Firm*—Wenderoth, Lind & Ponack

[57] ABSTRACT

A disc brake of the kind in which friction pads are applied to opposite faces of a rotatable disc by pistons working in a fixed caliper which straddles a portion of the disc. The caliper comprises two caliper members which are bolted together interposing therebetween a mounting plate. At least two mounting holes are formed in the mounting plate to mount the disc brake on a non-rotatable part of a vehicle.

1 Claim, 3 Drawing Figures

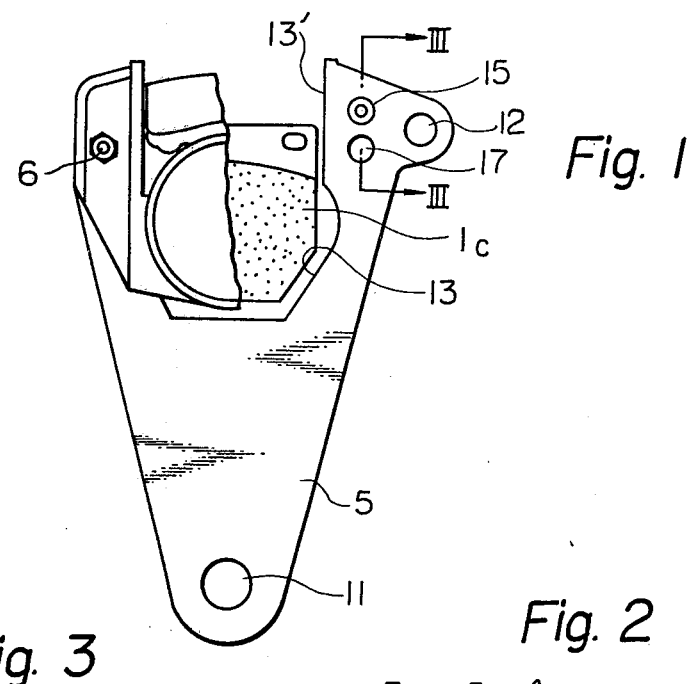
Fig. 1
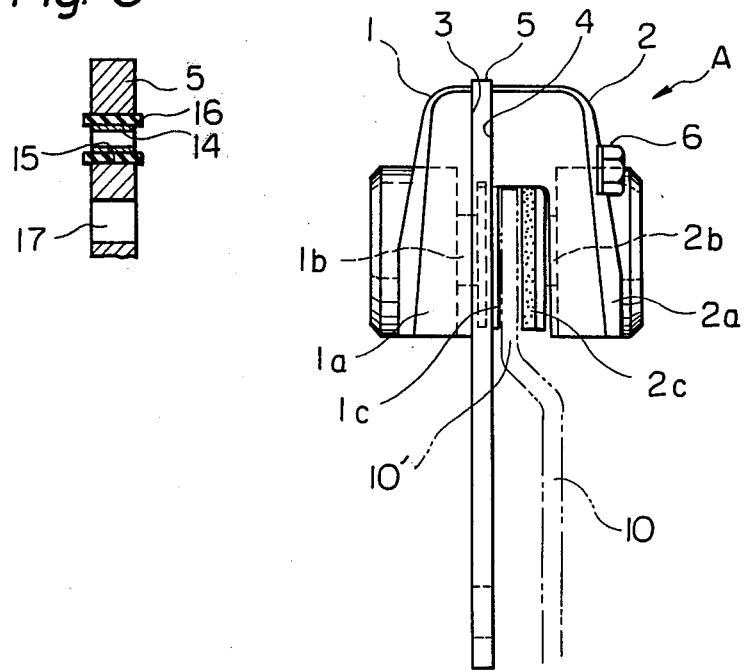
Fig. 3
Fig. 2

DISC BRAKE

BACKGROUND OF THE INVENTION

This invention relates to improvements in disc brakes of the kind in which friction pads are applied to opposite faces of a rotatable disc by pistons working in opposed hydraulic cylinders in a fixed caliper which straddles a portion of the disc.

Usually, the caliper has been formed of two complementaly members which are secured together by bolts, and for mounting the caliper on a non-rotatable part of a vehicle, a mounting portion such as a lug or the like has integrally been formed on one of the caliper members by casting or the like. Thus, there is problems such that the location and the configuration of the mounting portion shall conform to the mounting requirements of respective vehicles thereby increasing the types of the caliper and complicating the casting and machining operations.

SUMMARY OF THE INVENTION

An object of the present invention is to solve the problems aforementioned and, according to the invention, the caliper comprises two complementary members bolted together and interposing therebetween a mounting member which is adapted to be secured to a non-rotatable part of the vehicle.

More specifically, the disc brake according to the present invention comprises:

a substantially flat and substantially triangular mounting member having a first through bore in the apex portion of said mounting member for connecting said mounting member to a wheel shaft of a two-wheeled vehicle, said mounting member being spaced from a rotatable disc in the direction of its rotational axis, and said mounting member extended along a plane perpendicular to the rotational axis of said disc;

a first caliper member secured to one side surface of said mounting member and incorporating therein a cylinder-piston means for applying a first friction pad against one surface of the disc, a second caliper member secured to the opposite surface of said mounting member and incorporating therein a cylinder-piston means for applying a second friction pad against the opposite surface of said disc, said second caliper member straddling the periphery of said disc in a direction parallel to the rotational axis of said disc;

an aperture in said mounting member for receiving said piston pad therein and for absorbing the braking torque generated by said first friction pad;

a second through bore in the base portion of said mounting member for providing fluid communication between said cylinder-piston means and said first and second caliper members and a resilient bushing disposed within said second bore and having an axial length greater than the thickness of said mounting member and being in sealing relationship with said mounting member and said first and second caliper members.

BRIEF DESCRIPTION OF THE DRAWINGS

A preferred embodiment of the invention is illustrated by way of example in the accompanying drawings in which:

FIG. 1 is a partially broken front view of a disc brake according to the invention;

FIG. 2 is a side view of the disc brake, and

FIG. 3 is a sectional view taken along line III—III in FIG. 1.

PREFERRED EMBODIMENTS OF THE INVENTION

The disc brake illustrated comprises a caliper A formed of two complementary members 1 and 2. The caliper member 1 has a limb 1a incorporating therein a hydraulic cylinder (not shown), and a piston 1b is received in the hydraulic cylinder. Similarly, the caliper member 2 has a limb 2a incorporating therein a hydraulic cylinder (not shown) for receiving therein a piston 2b. A friction pad 1c is disposed between the piston 1b and a rotatable disc 10, and a friction pad 2c is disposed between the piston 2b and the disc 10. The friction pads 1c and 2c are supported on the caliper by one or more, preferably, two pins (not shown) extending between the limbs 1a and 2a of the caliper members 1 and 2. The caliper members 1 and 2 have generally similar configuration and are formed by casting or the like.

A mounting plate 5 is disposed between a surface 3 of the caliper member 1 and a surface 4 of the caliper member 2 and is secured to the caliper members by bolts 6. In the embodiment, the bolts 6 pass through bores 17 formed in the mounting plate 5 and screw-threadingly engage with threaded bores (not shown) formed in the caliper member 1. Preferably, the mounting plate 5 is disposed adjacent to the frictional surface portion or the working surface portion 10' of the disc 10 in mounting the disc brake on the vehicle.

In the embodiment, the mounting plate 5 has a generally V-shaped configuration as viewed in FIG. 1, and is secured to such as the wheel shaft of the rear wheel of two-wheeled vehicle through a hole 11 formed in the apex portion and, is secured to such as a fork member supporting the rear wheel by a bolt (not shown) passing through a hole 12 which is formed in the upper right portion of the mounting plate 5 as viewed in FIG. 1. A cut-out portion 13 is provided in the upper portion of the mounting plate 5 for receiving the friction pad 1c of the caliper member 1. A reaction force receiving surface 13' is provided in the cut-out portion 13 to directly receive the reaction force or the braking torque generated in the friction pad 1c in applying the brake.

A hole 15 is provided in the mounting plate 5 as shown in FIG. 3. A rubber bush 14 is received in the hole 15 and a rigid sleeve 16 is received in the bush 14. Hydraulic fluid for actuating the pistons 1b and 2b is supplied to the caliper through a fitting (not shown) provided on, for example, the caliper member 1, and is communicated with the cylinder receiving the piston 1b through a passage in the caliper member 1. The hydraulic fluid is branched from the passage in the caliper member 1 and passes through the sleeve 16 and through a passage (not shown) in the caliper member 2 to the cylinder receiving therein the piston 2b.

The rubber bush 14 has an axial length larger than the thickness of the mounting plate 5, and when the caliper members 1 and 2 and the mounting plate 5 are bolted together, opposite ends of the bush 14 projecting out of the mounting plate 5 are squeezed on the surfaces 3 and 4 thereby sealing fluid passages effectively. The rigid sleeve 16 prevents the reduction in the cross-sectional area of the passage.

In the conventional disc brakes of the kind aforementioned, the caliper has been formed of two caliper members secured together with the joint surfaces such as the surfaces 3 and 4 in FIG. 2 contacting with each other, further, a pair of lugs or the like having therein mounting bolt receiving holes have integrally been provided on one of the caliper members. Therefore, it has been required to change the configuration of the caliper member when the diameter of the disc or the location or the arrangement of the mounting portion has been changed in accordance with the requirements of respective vehicles. According to the present invention, the caliper members 1 and 2 can commonly be utilized with the mounting plate 5 interposed between the caliper members being changed to conform with the requirements of respective vehicles. The mounting plate 5 can easily be fabricated from a steel plate or the like, thus, it is possible to substantially reduce the manufacturing costs of various types of disc brakes. Preferably, the mounting plate 5 is formed to have the outer peripheral configuration larger than that of the surfaces 3 and 4 of the caliper members 1 and 2, whereby, the tolerance in the outer peripheral configuration of the surfaces 3 and 4 can be increased since the surfaces 3 and 4 do not directly contact.

What is claimed is:

1. A disc brake comprising
    a substantially flat and substantially triangular mounting member having a first through bore in the apex portion of said mounting member for connecting said mounting member to a wheel shaft of a two-wheeled vehicle, said mounting member being spaced from a rotatable disc in the direction of its rotational axis, and said mounting member extending along a plane perpendicular to the rotational axis of said disc;
    a first caliper member secured to one side surface of said mounting member and incorporating therein a cylinder-piston means for applying a first friction pad against one surface of the disc,
    a second caliper member secured to the opposite surface of said mounting member and incorporating therein a cylinder-piston means for applying a second friction pad against the opposite surface of said disc, said second caliper member straddling the periphery of said disc in a direction parallel to the rotational axis of said disc.
    an aperture in said mounting member for receiving said piston pad therein and for absorbing the braking torque generated by said first friction pad;
    a second through bore in the base portion of said mounting member for providing fluid communication between said cylinder-piston means and said first and second caliper members and
    a resilient bushing disposed within said second bore and having an axial length greater than the thickness of said mounting member and being in sealing relationship with said mounting member and said first and second caliper members.

* * * * *